United States Patent [19]

Shanley et al.

[11] Patent Number: 4,501,018
[45] Date of Patent: Feb. 19, 1985

[54] SIMPLEX TRANSCEIVER EMPLOYING A COMMON PIEZOELECTRIC ELEMENT FOR TRANSMITTING AND RECEIVING

[75] Inventors: Charles W. Shanley, Plantation; William V. Braun, Pompano Beach, both of Fla.

[73] Assignee: Motorola, Inc., Schaumburg, Ill.

[21] Appl. No.: 511,024

[22] Filed: Jul. 5, 1983

[51] Int. Cl.³ ............................ H04B 1/44; H04B 1/54
[52] U.S. Cl. .......................................... 455/83; 455/86
[58] Field of Search .................. 455/78, 79, 82, 83, 455/84, 86, 87, 89

[56] References Cited

U.S. PATENT DOCUMENTS

| | | |
|---|---|---|
| 2,985,753 | 4/1959 | Goodreau . |
| 3,470,472 | 9/1969 | Suzuki et al. ............................ 455/84 |
| 3,641,434 | 2/1972 | Yates et al. . |
| 3,925,729 | 12/1975 | Amoroso . |
| 3,983,484 | 9/1976 | Hodama . |
| 4,027,242 | 5/1977 | Yamanaka . |
| 4,053,717 | 10/1977 | Snider .................................. 455/89 |
| 4,054,837 | 10/1977 | Hibbs, Jr. et al. ................... 455/84 |
| 4,162,446 | 7/1979 | Cochran . |
| 4,254,504 | 3/1981 | Lewis et al. ......................... 455/87 |
| 4,462,009 | 7/1984 | Landt et al. ......................... 455/84 |

Primary Examiner—Jin F. Ng
Attorney, Agent, or Firm—Jerry A. Miller; James W. Gillman; Edward M. Roney

[57] ABSTRACT

A radio frequency transceiver is provided in which the crystal resonator and monolithic crystal filter devices therein all operate at or near the operating frequency of the transceiver, and which employs a single piezoelectric element to achieve the functions of receiver signal filtering, transmitter signal filtering, receiver local oscillator signal generation, and transmitter local oscillator signal generation. To achieve these functions, a crystal resonator and a monolithic crystal filter are situated on the same substrate of piezoelectric material. The crystal resonator portion of the piezoelectric device is employed to control the frequency at which a local oscillator generates radio frequency energy. Such crystal controlled local oscillator is shared by a receiver mixer circuit and a transmitter mixer circuit. Switching circuitry is employed to switch the crystal filter portion of the piezoelectric device from the receiver signal path to the transmitter signal path.

22 Claims, 3 Drawing Figures

SIMPLEX TRANSCEIVER EMPLOYING A COMMON PIEZOELECTRIC ELEMENT FOR TRANSMITTING AND RECEIVING

BACKGROUND OF THE INVENTION

This invention relates to simplified topology radio frequency transceiver circuits and, more particularly to a transceiver employing a single piezoelectric crystal to achieve both transmit and receive frequency control as well as transmit and receive signal filtering.

DESCRIPTION OF THE PRIOR ART

Conventional VHF-UHF radio frequency transceivers typically employ a plurality of piezoelectric devices to achieve both frequency control and signal filtering functions. For example, a typical receiver portion of a transceiver may include a receiving antenna coupled to a radio frequency amplifier having a piezoelectric filter at the output thereof. Such piezoelectric filter is typically a monolithic crystal filter which is rather expensive. The filtered radio frequency signals at the output of such crystal filter are provided to an appropriate mixer circuit or a plurality of staged mixer circuits for down conversion to more convenient intermediate frequencies than the frequency of the input signal at the antenna. A local oscillator associated with such mixer circuit typically employs yet another distinct crystal element to control the frequency of a local oscillator signal injected into the mixer circuit for purposes of down conversion. This receiver local oscillator crystal also adds significantly to the cost of the overall transceiver. In receivers employing a plurality of mixer stages, that is dual and triple conversion receivers, each mixer stage may employ a distinct oscillator crystal, thus adding significantly to the cost of the receiver. The output of the receiver mixer is typically coupled to appropriate demodulation and amplification circuitry to transform down converted radio frquency signals into audio signals capable of being heard by the transceiver user.

It is noted that in the aforementioned conventional receiver, the piezoelectric filter operates at the intermediate frequency (IF). For example, typical IF frequencies at which receiver piezoelectric filters operate are 455 kHz, 17.9 MHz, 10.7 MHz and 21.4 MHz. In a VHF high band transceiver, that is one operating between approximately 130 and 170 MHz, as in other transceivers at VHF and UHF, the transceiver is typically designed around the available piezoelectric filters. Thus, a 150 MHz transceiver receiver portion conventionally down converts an incoming 150 MHz signal to a substantially lower intermediate frequency at which filtering by a piezoelectric filter may be carried out. It is appreciated that in the conventional VHF or UHF transceiver, the piezoelectric filter and the piezoelectric resonator for the local oscillator operate at frequencies far below the operating frequency of the transceiver. (In this discussion, the term "operating frequency" is defined to mean the output frequency at which the transmitter portion of the transmitter transmits and the receiver portion receives.)

A conventional transmitter portion of a VHF-UHF radio frequency transceiver typically includes a number of piezoelectric elements. For example, in one type of frequency modulation transmitter portion, a microphone is coupled to a voltage controlled oscillator (VCO) to convert an audio signal applied to the microphone to a frequency modulated radio frequency signal at the output of the VCO. The radio frequency signal thus generated at the output of the VCO is provided to the input of a mixer circuit which up converts the radio frequency signal to the frequency at which transmission is desired. A piezoelectric crystal element is typically used in a local oscillator associated with such transmitter mixer circuit. Again, such crystal elements tend to be expensive. The output of the transmitter mixer circuit is coupled to the input of a multipole monolithic crystal filter which exhibits a bandpass-type response in order to suppress undesired spurious signals produced in the course of transmitter signal generation and up conversion. The output of the transmitter crystal filter is coupled via appropriate radio frequency amplification circuitry to an antenna which radiates the filtered transmit signal.

A conventional transmitter portion of a VHF-UHF transceiver often employs one or more frequency multipliers to multiply a transmitter signal at the relatively low transmitter IF frequency up to the desired final output frequency, for example 150 MHz. Unfortunately, such multipliers generate undesired spurious signals having significant amplitude. It is noted that the piezoelectric resonator or the local oscillator in such transmitter portions operate at a frequency far below and substantially removed from the operating frequency of the transceiver.

In summary, it is seen that a typical radio frequency transceiver may employ as many as four (4) distinct and separate piezoelectric devices to process signals therein, that is, a receiver local oscillator crystal, a receiver crystal filter, a transmitter local oscillator crystal, and in some transceivers, an IF transmitter crystal filter. Each of these crystal devices, both resonators and filters, typically operate at frequencies substantially removed from and far below the operating frequency of the conventional VHF or UHF transceiver. The large number of separate piezoelectric devices is a very significant portion of the overall transceiver cost.

One object of the present invention is to provide a radio frequency transceiver which employs substantially fewer components than conventional transceivers.

Another object of the present invention is to provide a radio frequency transceiver which employs fewer distinct piezoelectric devices in order to achieve decreased transceiver cost.

Another object of the invention is to provide a radio frequency transceiver which eliminates expensive frequency multiplier stages, exhibits reduced power consumption and generates fewer undesired spurious signals.

Another object of the invention is to provide a radio frequency transceiver which exhibits increased reliability.

These and other objects of the invention will become apparent to those skilled in the art upon consideration of the following description of the invention.

BRIEF SUMMARY OF THE INVENTION

The present invention is directed to providing a radio frequency transceiver with a decreased number of piezoelectric devices. The radio frequency transceiver of the invention includes a radio frequency receiver portion for receiving input signals at a first predetermined frequency. The transceiver further includes a radio frequency transmitter portion for generating output signals at the first predetermined frequency. An oscillator is coupled to each of the transmitter portion and the receiver portion for generating signals which control the frequency on which the receiver portion receives and the transmitter portion transmits. A piezoelectric resonator is coupled to the oscillator for controlling the frequency of the signals generated thereby. A piezoelectric filter is selectively coupled to the receiver portion and the transmitter portion for filtering input signals provided to the receiver portion and for filtering output signals generated by the transmitter portion. The piezoelectric resonator and the piezoelectric filter each operate at or near the first predetermined frequency.

The features of the invention believed to be novel are set forth with particularity in the appended claims. The invention itself, however, both as to organization and method of operation, together with further objects and advantages thereof, may best be understood by reference to the following description taken in conjunction with the accompanying drawings.

DETAILED DESCRIPTION OF THE PREFERRED EMBODIMENT

Figure 1:
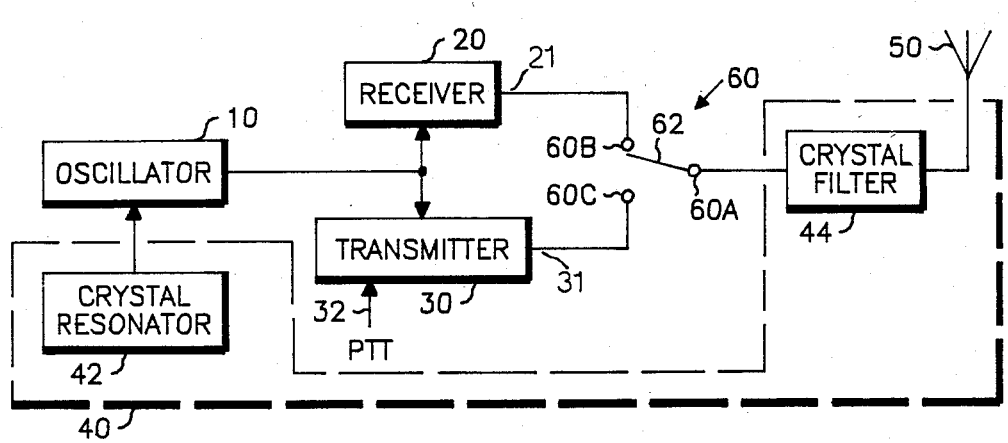
FIG. 1 is a simplified block diagram of the transceiver of the present invention.

FIG. 1 shows a simplified version of a simplex transceiver embodiment of the present invention. The transceiver of FIG. 1 includes a local oscillator 10 for controlling the operating frequencies of both receiver 20 and transmitter 30 which are both coupled to the output of oscillator 10. Receiver 20 has an input line 21. Transmitter 30 has an output line 31 and a push-to-talk control line 32. A piezoelectric device 40 (discussed later in more detail) includes a resonator portion 42 operatively coupled to oscillator 10 as shown in FIG. 1. Resonator portion 42 provides the frequency standard which determines the frequency at which oscillator 10 oscillates. Specific frequencies discussed in this specification are given by way of example and not limitation. Those skilled in the art will realize that the principles of the invention are applicable to frequencies other than those discussed by way of example. In one embodiment of the invention wherein the transceiver transmits and receives signals exhibiting a frequency of approximately 150 MHz, crystal resonator portion 42 resonates at a frequency of approximately 149.965 MHz which is near the 150 MHz operating frequency of the transceiver.

Resonator portion 42 and oscillator 10 are thus common to both receiver 20 and transmitter 30. Piezoelectric device 40 further includes a monolithic crystal filter portion 44 exhibiting a bandpass-type response centered at the operating frequency of approximately 150 MHz. The half power bandwidth of filter portion 44 at 150 MHz is 12 kHz. Crystal filter portion 44 is coupled between an antenna 50 and a signal routing switch 60 as shown in FIG. 1. Signal routing switch 60 is conveniently a double pole, single throw mechanical switch or the electrical equivalent thereof. Switch 60 includes a common terminal 60A coupled to crystal filter portion 44. Switch 60 further includes a wiper 62 coupled to common terminal 60A. Wiper 62 swings between terminals 60B and 60C. Terminal 60B is coupled to the input of a receiver 20 and terminal 60C is coupled to the output of transmitter 30 as shown in FIG. 1.

The transceiver of FIG. 1 operates as follows. For purposes of discussion, switch wiper 62 is shown in the receive position, that is, in contact with terminal 60B. In the receive mode, signals exhibiting the operating frequency of 150 MHz impinge on antenna 50 and are provided to bandpass monlithic crystal filter 44. Bandpass filter 44 substantially attenuates signals outside of the bandpass of the filter and provides the remaining signals exhibiting a frequency within the bandpass (centered at approximately 150 MHz) to switch terminal 60A. Since wiper 62 contacts switch terminal 60B when in the receive mode, the filtered 150 MHz signals are provided to the input 21 of receiver 20. Receiver 20 appropriately down converts the 150 MHz filtered signals to a frequency of 35 kHz in a manner described in more detail in the subsequent discussion of FIG. 2. The down converted signal is then demodulated, amplified and provided to a speaker such that the transceiver user hears the audio signal which is carried by the 150 MHz radio frequency signal provided to antenna 50. It is emphasized that crystal resonator portion 42 (which is on the same piezoelectric substrate as crystal filter portion 44 in one embodiment), controls the frequency of oscillator 10 which is used by receiver 20 to appropriately down convert or mix the filter 150 MHz radio frequency signal. It is seen that in the receiver portion of the invention, both crystal resonator portion 42 and crystal filter portion 44 oeprate at or near the 150 MHz operating frequency of the transceiver.

The transmitter portion of the transceiver of FIG. 1 operates as follows. To switch from receive mode to transmit mode, a push-to-talk (PTT) line 32 of transmitter 30 is actuated to turn transmitter 30 from an off state to an on state. In conjunction with actuating PTT line 32, the transceiver user actuates switch 60 to change the position of wiper 62 so as to couple terminal 60A to terminal 60C. Those skilled in the art will of course appreciate that the switch which is employed as signal routing switch 60 and the switch employed to actuate PTT line 32 may in practice be parts of the same switch. Transmitter 30 when thus actuated, generates a modulated radio frequency signal exhibiting a frequency of approximately 150 MHz at the output of transmitter 30. The manner in which this transmitter output 31 signal is generated is described in more detail in the subsequent discussion of FIG. 2. However, it is noted that crystal resonator portion 42, which is on the same piezoelectric substrate as crystal filter portion 44, is employed to control the frequency of the oscillator signal generated by oscillator 10 which, in turn, determines the frequency of modulated upconverted transmit signals generated by transmitter 30. These modulated transmitter signals are provided to crystal filter portion 44 via switch 60. Crystal filter portion 44 acts to substantially attenuate spurious signals not within the bandpass thereof which is centered about 150 MHz. Thus, essentially only signals within the bandpass centered about 150 MHz of filter portion 44 are provided to antenna 50 for radiation. It is noted that in the transmit mode, the embodiment of the transceiver invention shown in FIG. 1 employs the same piezoelectric device to achieve control of the frequency of the signals generated thereby as well as the spectral purity of such signals. It is seen that in the transmitter portion of the invention, both crystal resonator portion 42 and crystal filter portion 44 operates at or near the 150 MHz operating frequency of the transceiver.

Figure 2:
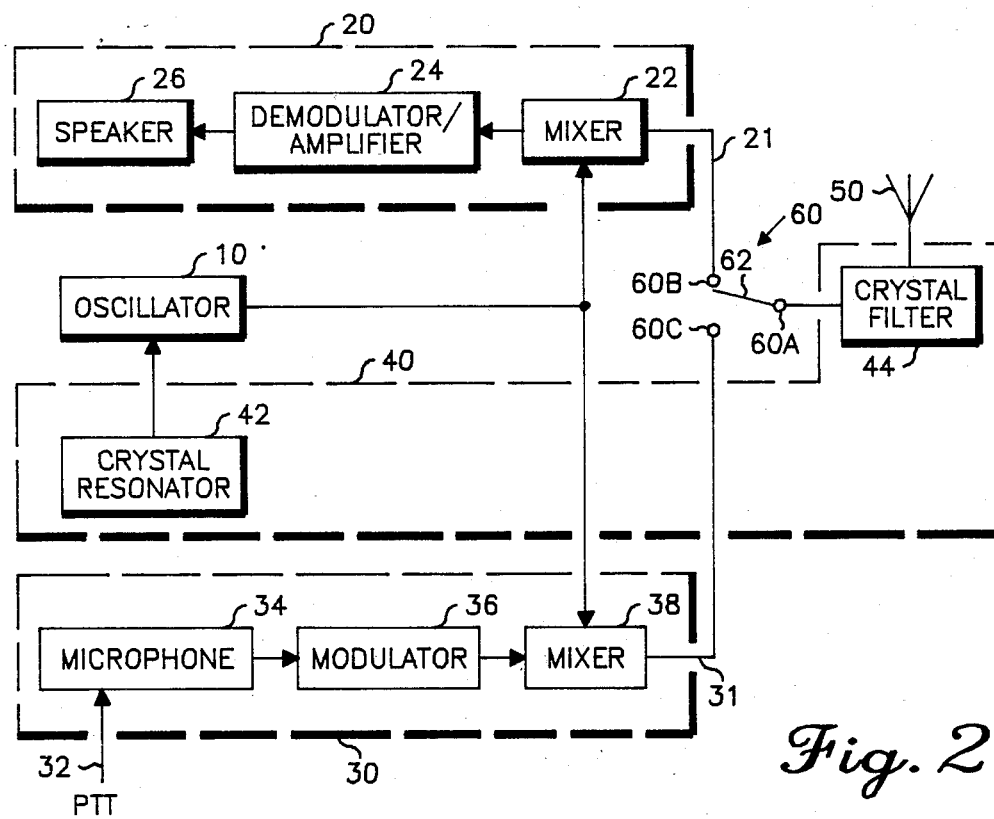
FIG. 2 is a more detailed block diagram of the transceiver of the present invention.

The transceiver of FIG. 2 is substantially identical to the transceiver of FIG. 1 except that the component blocks which make up receiver 20 and transmitter 30 are specified in more detail. The detailed operation of the receiver portion of the transceiver of FIG. 2 is now discussed. Radio frequency signals exhibiting a frequency of approximately 150 MHz pass from antenna 50 through crystal filter portion 44 and via switch 60 to receiver 20 in the manner already described. Upon reaching receiver 20, the filtered radio frequency signals are provided to the input of a mixer 22. These 150 MHz filtered radio frequency signals are down-converted or mixed with radio frequency signals exhibiting a frequency of 149.965 MHz (that is, 150 MHz–35 kHz). The 149.965 MHz mixing signal or local oscillator signal is generated by oscillator 10. It is recalled that crystal resonator portion 42 is coupled to local oscillator 10 to control the frequency of signals generated by oscillator 10. Crystal resonator 10 operates substantially near the 150 MHz operating frequency.

Crystal resonator portion 42 exhibits appropriate size and dimensions to resonate at a frequency of 149.965 MHz which is substantially near the operating frequency and thus oscillator 10 is caused to oscillate and generate a signal at that same frequency. The 149.965 MHz signal thus provided to mixer 22 by oscillator 10 causes mixer 22 to down-convert the 150 MHz filtered input signals provided thereto to a frequency of 35 kHz. The 35 kHz radio frequency signal thus generated is demodulated by demodulator-amplifier 24 which generates an audio frequency signal corresponding to the intelligence conveyed in the modulation on the received 150 MHz signal. Demodulator-amplifier 24 provides an audio frequency signal of appropriate amplitude to drive speaker 26 coupled thereto to produce acoustic signals of appropriate level for transceiver user listening.

To place the transmitter portion in transmit mode, PTT line 32 is actuated to the transmit mode by depressing an appropriate switch which simultaneously causes switch 60 or its equivalent to connect the filter 44 to the output 31 of transmitter 30. As described earlier, wiper 62 changes position to connect terminal 60A to terminal 60C. The transceiver user speaks into microphone 34 causing an audio frequency signal to be generated at the output thereof. The output of microphone 34 is coupled to the input of a modulator 36, for example, a frequency modulator such as a voltage controlled oscillator, although other types of modulators such as amplitude modulators, single side band modulators, and so forth, are employed as modulator 36 in other embodiments of the invention. Modulator 36 thus generates a modulated radio frequency signal exhibiting a frequency of 35 kHz, for example, at the output of modulator 36.

The output of modulator 36 is coupled to the input of a mixer circuit 38 which up-converts the 35 kHz modulated signal to 150 MHz. This is accomplished by the mixer circuit arrangement shown in FIG. 2 wherein the same oscillator 10-crystal resonator 42 employed to control down conversion in receiver 20, already discussed in detail, is also employed now to control up conversion of the modulated radio frequency signal from modulator 36. As seen in FIG. 2, the output of oscillator 10 is coupled to transmitter mixer 38 as well as receiver mixer 22. The 149.965 MHz oscillator signal from oscillator 10 thus mixes with the 35 kHz modulated signal from modulator 36 at mixer 38 causing a modulated radio frequency signal to be generated at a frequency of approximately 150 MHz at the output of mixer circuit 38.

In the transmit mode, the output of mixer circuit 38 is coupled via switch 60 to crystal filter portion 44 of piezoelectric device 40. Crystal filter portion 44 acts as a bandpass filter with a center frequency of approximately 150 MHz which causes spurious signals generated by transmitter 30 outside of the bandpass of crystal filter portion 44 to be substantially attenuated while passing desired radio frequency signals exhibiting a frequency of approximately 150 MHz through to antenna 50 which is coupled to the output of crystal filter portion 44.

It is noted that modulator 36 of transmitter 30 generates modulated radio frequency signals exhibiting a frequency substantially the same as the frequency of the down-converted signals generated at the output of mixer 22 of receiver 20, namely 35 kHz. This permits both receiver 20 and transmitter 30 to share the same local oscillator 10, which generates a 149.965 MHz signal, in common.

It is thus seen that in the transceiver of FIG. 2, the same piezoelectric device 40 is employed as the transmitter local oscillator frequency control element, the receiver local oscillator frequency control element, the transmitter signal filter and the receiver signal filter. More specifically, crystal filter portion 44 is employed as both the transmitter crystal filter and the receiver crystal filter, and as already discussed, crystal resonator portion 42 is employed as the frequency control element for oscillator 10 which operates as both the transmitter local oscillator and receiver local oscillator. It is emphasized that crystal resonator portion 42 and crystal filter portion 44 are situated on the same piezoelectric substrate in the transceiver of the present invention.

A crystal mounting arrangement for such piezoelectric crystals which include both an oscillator resonator portion and a monolithic crystal filter portion on the same piezoelectric substrate is described and claimed in U.S. Pat. No. 4,282,454 issued to Wakat, Jr., et al., the disclosure thereof being incorporated herein by reference. A method for mouting a piezoelectric crystal which includes both a resonator portion and a monolithic crystal filter portion and a connection arrangement therefore is described and claimed in U.S. Pat. No. 4,334,343, issued to Wakat, Jr., et al., the disclosure thereof being incorporated herein by reference. The above-cited U.S. Patents are both assigned to the instant Assignee. A special pedestal mounting arrangement for supporting piezoelectric crystals having both oscillator resonator and monolithic crystal filter portions thereon is described and claimed in U.S. patent application Ser. No. 408,409 filed Aug. 16, 1982, and assigned to the instant Assignee, the disclosure thereof being incorporated by reference.

The transceiver shown in FIG. 2 exhibits relatively low gain in the receiver and transmitter portions thereof. That is, receiver portion 20 works best in the presence of relatively high amplitude input signals at antenna 50. Further, transmitter 30 generates transmitter signals which exhibit a relatively low amplitude. In many applications, it is desirable to have a transceiver which exhibits higher gain in both the transmitter and receiver portion thereof. Such a high gain transceiver is shown in FIG. 3.

Figure 3:
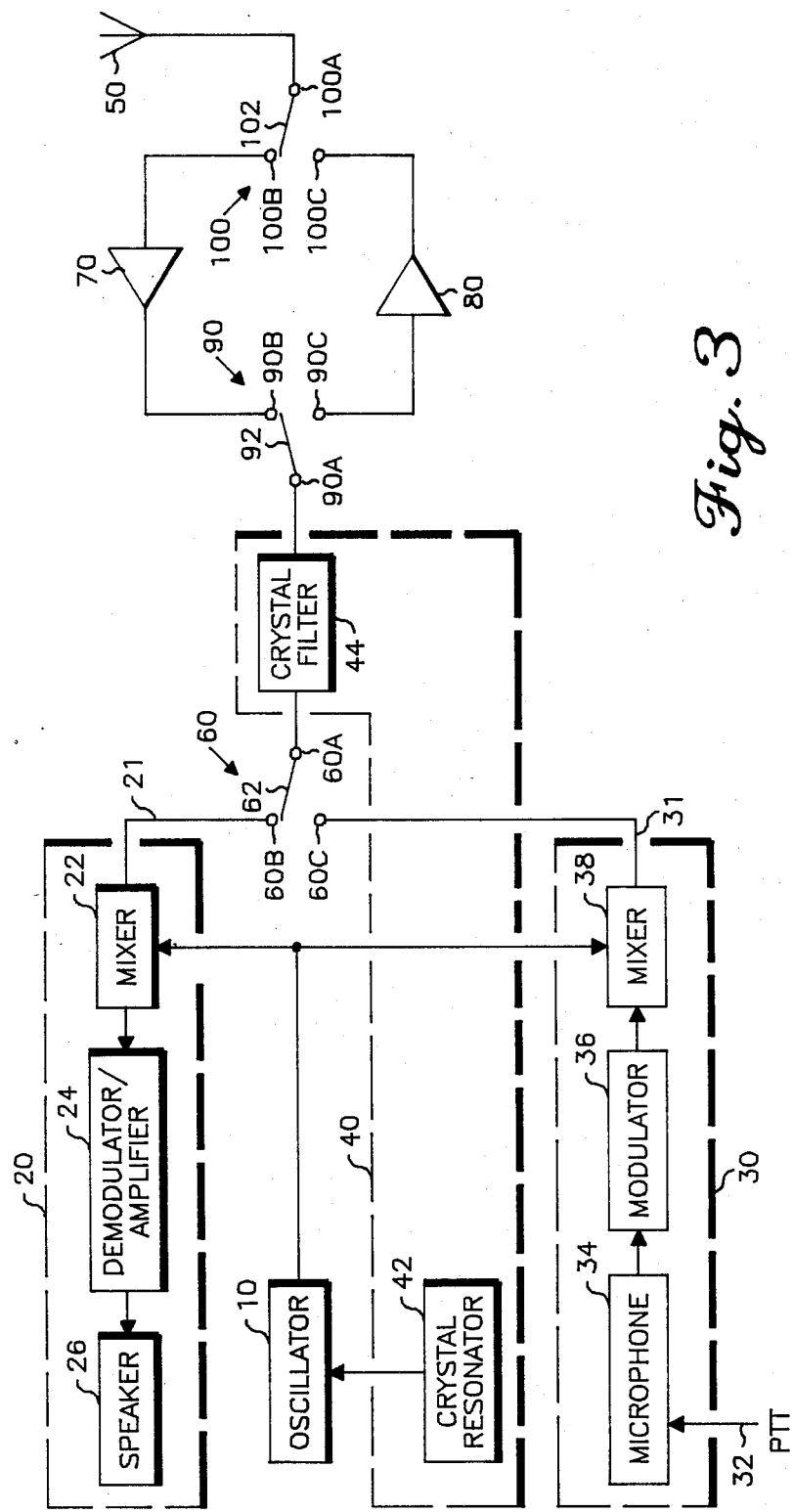
FIG. 3 is a block diagram of an alternative embodiment of the transceiver of the invention.

The transceiver of FIG. 3 is substantially identical to the transceiver of FIG. 2 except for the following modifications. A receiver amplifier 70 and a transmitter amplifier 80 are selectively switchably coupled between antenna 50 and crystal filter portion 44. More specifically, a single pole double throw signal routing switch 90 and an equivalent electronic switch is coupled between crystal filter portion 44 and receiver amplifier 70 as shown in FIG. 3. Switch 90 includes a wiper 92, a common terminal 90A coupled to crystal filter portions 44, and terminals 90B and 90C. Terminal 90B is coupled to receiver amplifier 70. Terminal 90C is coupled to transmitter amplifier 80. A single pole double throw switch 100 or the electronic equivalent thereof is coupled between receiver amplifier 70 and antenna 50 as shown in FIG. 3. Switch 100 includes a wiper 102, a common terminal 100A electrically coupled to antenna 50, and terminals 100B and 100C. Terminal 100B is coupled to receiver amplifier 70. Terminal 100C is coupled to the output of transmitter amplifier 80. Switches 90 and 100 operate in tandem with switch 60 in a push-to-talk fashion wherein when the transceiver is in the receive mode, (PTT line 32 not actuated) switches 60, 90, and 100 each have their respective wipers contacting terminals 60B, 90B, and 100B, respectively, as shown in FIG. 3. Thus, 150 MHz radio frequency signals impinging on antenna 50 are coupled via switch 100 to receiver radio frequency amplifier 70 at which such signals are amplified. The amplified radio frequency signals thus generated are provided to crystal filter portion 44 via switch 90. The operation of crystal filter portion 44 and the receiver 20 circuitry coupled thereto via switch 60 have already been described in detail.

When PTT line 32 is actuated by a transceiver user, the transceiver of FIG. 3 switches from a receive mode to a transmit mode wherein transmitter 30 is turned on so as to generate modulated 150 MHz radio frequency signals and switches 60, 90, and 100 respectively switch to terminals 60C, 90C, and 100C so as to couple the radio frequency signals generated by transmitter 30 to crystal filter portion 44 and transmitter amplifier 80. Radio frequency amplifier 80 amplifies filtered radio frequency signals from crystal filter portion 44 to the desired amplitude prior to radiation by antenna 50. It is noted that for convenience, switches 60, 90, and 100, as well as the switch employed to actuate PTT line 32 may conveniently be a single multipole switch or the electronic equivalent switch thereof. For example, PIN diode switching may be employed to accomplish the switching operations detailed above so as to minimize mechanical switching. Thus oscillator resonator portion 42 is shared by both receiver 20 and transmitter 30, and crystal filter portion 44 is shared by both receiver 20-receiver amplifier 70, and transmitter 30-transmitting amplifier 80. Oscillator resonator 42 and crystal filter 44 advantageously operate at or near the 150 MHz operating frequency. That is, oscillator resonator 42 operates at a frequency substantially near the operating frequency of the transceiver and crystal filter 44 operates approximately at the operating frequency of the transceiver. The foregoing describes a radio frequency transceiver in which the crystal devices therein operate approximately at or near the operating frequency of the transceiver, and which in one embodiment employs a single piezoelectric element to achieve both transmitter filtering and receiver filtering functions as well as receiver local oscillator signal generation and transmitter local oscillator signal generation functions. A simplified, more cost effective radio frequency transceiver is thus provided. Although this specification describes the transceiver of the invention in terms of processing audio signal information, those skilled in the art will appreciate that the invention is used to process data signals and other information signals as well.

While only certain preferred features of the invention have been shown by way of illustration, many modifications and changes will occur to those skilled in the art. It is, therefore, to be understood that the present claims are intended to cover all such modifications and changes as fall within the true spirit of the invention.

What is claimed is:

1. A radio frequency transceiver comprising:
   radio frequency receiver means for receiving input signals at a first predetermined frequency;
   radio frequency transmitter means for generating output signals at said first predetermined frequency;
   oscillator means, coupled to each of said transmitter means and said receiver means, for generating signals which control the frequency on which said receiver means receives and said transmitter means transmits;
   piezoelectric resonator means, coupled to said oscillator means, for controlling the frequency of the signals generated thereby;
   piezoelectric filter means, selectively coupled to said receiver and transmitter means, for filtering input signals provided to said receiver means and for filtering output signals generated by said transmitter means,
   said piezoelectric resonator means and said piezoelectic filter means each operating at or near said first predetermined frequency.

2. The transceiver of claim 1 including first switching means for coupling said filter means to said receiver means when input signal reception is desired and for coupling said filter means to said transmitter means when output signal transmission is desired.

3. The transceiver of claim 2 including first signal amplifying means, selectively coupled to said filter means, for amplifying said input signals, and including second signal amplifying means, selectively coupled to said filter means, for amplifying said output signals.

4. The transceiver of claim 3 including second switching means for coupling said first amplifying means to said filter means when input signal reception is desired and for coupling said second amplifying means to said filter means when output signal transmission is desired.

5. The transceiver of claim 4 including an antenna selectively coupled to said first and second amplifying means.

6. The transceiver of claim 5 including third switching means for coupling said antenna to first amplifying means when input signal reception is desired and for coupling said antenna to said second amplifying means when output signal transmission is desired.

7. The transceiver of claim 1 including signal amplifying means, selectively coupled to said filter means, for amplifying said output signals.

8. The transceiver of claim 1 including an antenna operatively coupled to said filter means.

9. The transceiver of claim 1 including first signal amplifying means, selectively coupled to said filter means, for amplifying said input signals.

10. The transceiver of claim 9 including second signal amplifying means, selectively coupled to said filter means, for amplifying said output signals.

11. The transceiver of claim 1 wherein said first predetermined frequency is at least equal to 130 MHz.

12. A radio frequency transceiver comprising:
radio frequency receiver means for receiving input signals at a first predetermined frequency;
radio frequency transmitter means for generating output signals at said first predetermined frequency;
oscillator means, coupled to each of said transmitter means and said receiver means, for generating signals which control the frequency on which said receiver means receives and said transmitter means transmits;
piezoelectric resonator means, coupled to said oscillator means, for controlling the frequency of the signals generated thereby;
piezoelectric filter means, selectively coupled to said receiver and transmitter means, for filtering input signals provided to said receiver means and for filtering output signals generated by said transmitter means,
said piezoelectric resonator means and said piezoelectic filter means being situated on a common substrate of piezoelectric material, said piezoelectric resonator means and said piezoelectric filter means each operating at or near said first predetermined frequency.

13. The transceiver of claim 12 including first switching means for coupling said filter means to said receiver means when input signal reception is desired and for coupling said filter means to said transmitter means when output signal transmission is desired.

14. The transceiver of claim 13 including first signal amplifying means, selectively coupled to said filter means, for amplifying said input signals, and including second signal amplifying means, selectively coupled to said filter means, for amplifying said output signals.

15. The transceiver of claim 14 including second switching means for coupling said first amplifying means to said filter means when input signal reception is desired and for coupling said second amplifying means to said filter means when output signal transmission is desired.

16. The transceiver of claim 15 including an antenna selectively coupled to said first and second amplifying means.

17. The transceiver of claim 16 including third switching means for coupling said antenna to first amplifying means when input signal reception is desired and for coupling said antenna to said second amplifying means when output signal transmission is desired.

18. The transceiver of claim 12 including signal amplifying means, selectively coupled to said filter means, for amplifying said output signals.

19. The transceiver of claim 12 including an antenna operatively coupled to said filter means.

20. The transceiver of claim 12 including first signal amplifying means, selectively coupled to said filter means, for amplifying said input signals.

21. The transceiver of claim 20 including second signal amplifying means, selectively coupled to said filter means, for amplifying said output signals.

22. The transceiver of claim 12 wherein said first predetermined frequency is at least equal to 130 MHz.

* * * * *